June 6, 1967  A. HARMENS  3,323,316
NITROGEN RECOVERY FROM A GASEOUS MIXTURE
Filed April 21, 1964
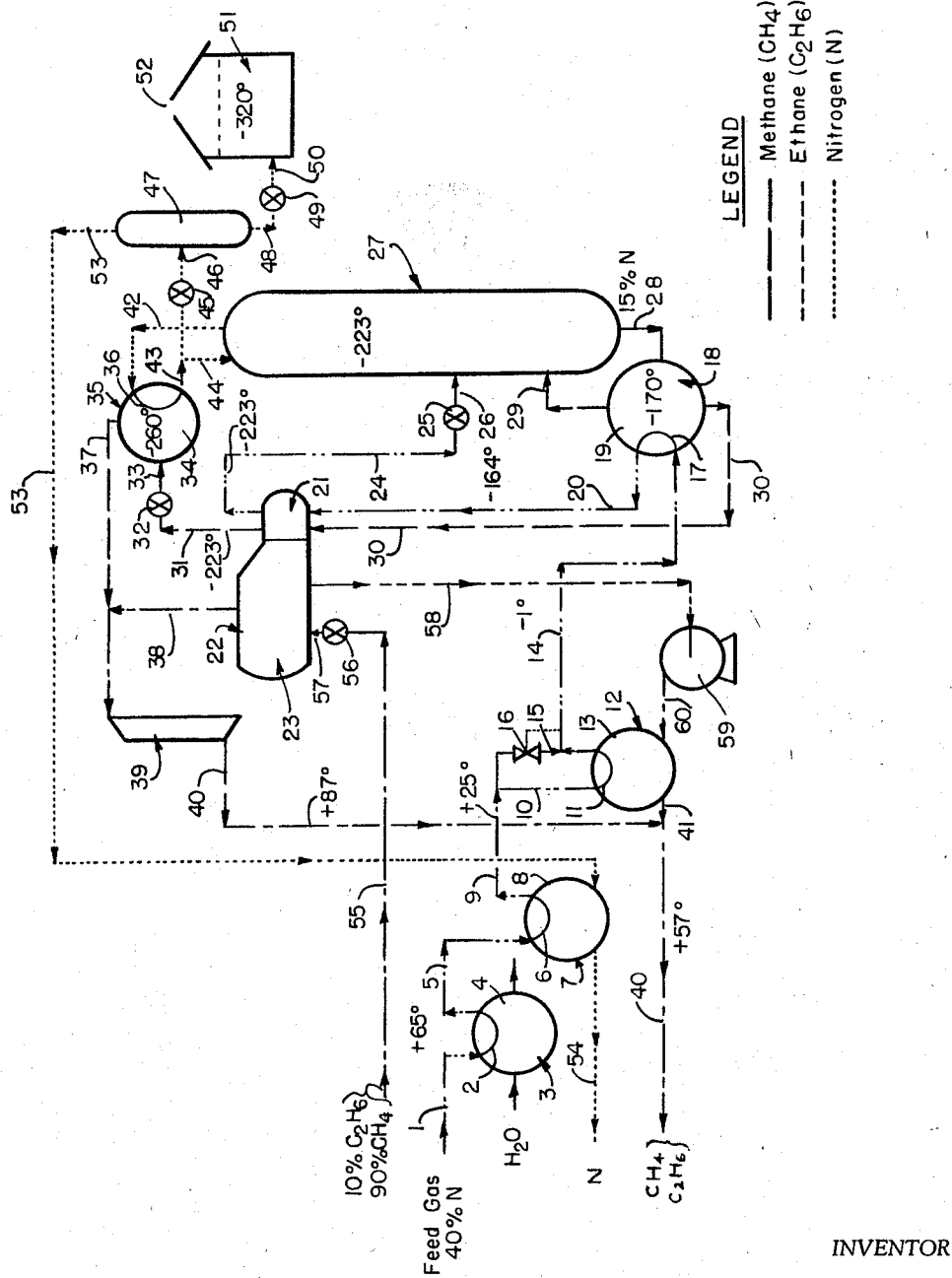
INVENTOR
Alexander Harmens
BY Max L. Libman
ATTORNEY

United States Patent Office 3,323,316
Patented June 6, 1967

3,323,316
NITROGEN RECOVERY FROM A
GASEOUS MIXTURE
Alexander Harmens, Purley, Surrey, England, assignor to Conch International Methane Limited, Nassau, Bahamas, a Bahamian company
Filed Apr. 21, 1964, Ser. No. 361,472
Claims priority, application Great Britain, Aug. 19, 1963, 32,706/63
6 Claims. (Cl. 62—28)

This invention relates to the processing of a mixture of gases. More particularly, it concerns a method of separating nitrogen from a nitrogen rich feed gas (for example nitrogen rich natural gas) to give a product gas lean in nitrogen.

According to the present invention, a method of separating nitrogen from a nitrogen rich feed gas to give a product gas lean in nitrogen comprises:

(a) Liquefying the nitrogen rich feed gas;
(b) Fractionally distilling the liquefied feed gas from step (a) to give a top gas comprising gaseous nitrogen and to leave a bottom liquid, heat removed from the feed gas in step (a) being used to vaporize part of said bottom liquid to give a gas that provides bottom heat for the fractionation and to leave a liquefied product gas lean in nitrogen;
(c) Cooling the liquefied product gas from step (b);
(d) Reducing the pressure on the cooler liquefied product gas from step (c);
(e) Vaporizing the liquefied product gas from step (d) by indirect heat exchange with the top gas from step (b) to give product gas lean in nitrogen and to condense said top gas; and
(f) Recycling part of the liquefied top gas from step (e) to the fractional distillation in step (b).

The steps described above effect a substantial reduction in the nitrogen content of the nitrogen rich feed gas. The invention is of general application, but is particularly suitable for upgrading a nitrogen rich natural gas. For example, the invention can be used to upgrade natural gas containing up to 50% nitrogen.

In the practice of the present invention, the part vaporization of bottom liquid in the step (b) is performed in the reboiler of the distillation column used to effect the fractional distillation.

If the feed gas is available at a pressure greater than that required in the fraction distillation stage of step (b), the pressure on the feed gas can be suitably reduced before effecting the step (b). This can have the effect of cooling the liquefied feed gas by part evaporation as it enters the fractional distillation stage. However, it is often more convenient to cool the liquefied feed gas before reducing its pressure, thereby reducing, perhaps preventing, the evaporation. The cooling can conveniently be effected by means used to effect the cooling in step (c).

The cooling in step (c) can be effected by any convenient means available. If there is available a source of liquefied gas of the same nature as the less volatile component of the feed gas, evaporation of such a supply is a very convenient means for this purpose, because the vapor produced from it can be mixed with the product gas from the step (e) to give a product gas still leaner in nitrogen. This is a situation that may easily arise in the case of liquefied natural gas, and the present invention is of particular utility in such circumstances.

When the cooling in step (c) is effected by evaporating liquefied gas of the same nature as the less volatile component of the feed gas, the residual liquid produced by evaporation of such a supply can also be used to cause a further reduction in the nitrogen content of the product gas. Thus, the pressure on the residual liquid can be increased, and the liquid then used to cool part of the feed gas before effecting the step (a), thereby partly vaporizing the residual liquid. The resultant mixture of gas and liquid can then be mixed with compressed gas to give the still leaner product gas, said compressed gas being obtained by compressing a mixture of product gas from the step (e) and the vaporized liquefied gas obtained from the liquefied gas used to cool by heat exchange the liquefied product gas cooled in step (c).

The remainder of the liquefied top gas obtained after effecting the step (f) contains useful cold. The pressure on this liquid can be reduced to give a cooler gas comprising gaseous nitrogen and to leave a cooler liquid comprising liquefied nitrogen. The cooler gas can then be used to cool the feed gas.

The present invention will now be illustrated by reference to the accompanying drawing, which is a flow sheet for practicing the invention.

A feed gas consisting of methane, 60 mol percent and nitrogen, 40 mol percent under a pressure of 750 p.s.i.a. and at a temperature of 75° F. enters the system via a line 1, and passes into a coil 2 in a water cooler 3. In the coil 2, the feed gas is cooled to a temperature of 65° F. by indirect heat exchange with water in the shell space 4 of the water cooler. The cooler feed gas passes from the coil 2 via a line 5 into a coil 6 in the heat exchanger 7. In the coil 6, the feed gas is further cooled to a temperature of about 25° F. by indirect heat exchange with gaseous nitrogen in the shell space 8 of the heat exchanger. The cooler feed gas passes from the coil 6 into a line 9.

Part of the feed gas in the line 9 passes via an outgoing branch line 10 thereof into a coil 11 in a further heat exchanger 12. In the coil 11, the feed gas is cooled by indirect heat exchange with a liquid consisting of methane, 27.3 mol percent and ethane, 72.7 mol percent in the shell space 13 of the heat exchanger. The cooler feed gas passes from the coil 11 into a line 14, in which it mixes with feed gas from an incoming branch line 15 of the line 14. The feed gas in the line 15 is the rest of the feed gas in the line 9 which has continued therealong and passed via a control valve 16 into the line 15. The resistance to flow of feed gas presented by the valve 16 controls the amount of feed gas passing from the line 9 into the branch line 10 thereof. The opening of the valve 16 is controlled by the temperature of the gas mixture obtained in the line 14, and is self-adjustable to obtain a mixture of feed gas in the line 14 which has a temperature of about −1° F.

The mixture of feed gas obtained in the line 14 continues therealong and passes into a coil 17 in a reboiler 18 of a distillation column. In the coil 17, the feed gas is subjected to indirect heat exchange with liquid methane and nitrogen in the shell space 19 of the reboiler, and is thereby cooled to a temperature of −164° F. and completely liquefied. Liquefied feed gas passes from the coil 17 via a line 20 into a separate part of the warm side 21 of an aftercooler 22. In the warm side 21, the liquefied feed gas is subcooled to a temperature of −223° F. by indirect heat exchange with partly evaporating liquefied natural gas in the cold side 23 of the aftercooler. The cooler liquefied feed gas passes from the warm side 21 via a line 24 and a reduction valve 25 into a further line 26 in which there is a lower pressure of 290 p.s.i.a. The drop in pressure does not affect the temperature of the liquefied feed gas. The liquefied feed gas then passes via the line 26 into a distillation column 27 as a saturated liquid under pressure of 290 p.s.i.a. and at a temperature of −223° F. In the distillation column 27, fractionation of the liquefied feed gas occurs to give a top gas containing nitrogen and a bottom liquid containing about 15% nitrogen.

The bottom in the distillation column 27 passes therefrom via line 28 into the shell space 19 of the reboiler 18. In the shell space 19, the bottom liquid is partly vaporized by being heated to a temperature of −170° F. by the feed gas in the coil 17 of the reboiler as described above. The resultant gas passes from the shell space 19 via a line 29 into the bottom part of the column 27 so as to provide the necessary heat for effecting distillation. The residual liquid, which is liquefied product gas lean in nitrogen, passes from the shell space 19 via a line 30 into a separate part of the warm side 21 of the aftercooler 22. In the warm side 21, the liquefied product gas is subcooled to a temperature of −223° F. The liquefied product gas passes from the warm side 21 via a line 31 and a reduction valve 32 into a further line 33 in which there is a lower pressure of 15 p.s.i.a. The liquefied product gas in line 33 then passes into the shell space 34 of a condenser 35 for condensing the top gas of the distillation column 27. In the shell space 34, the liquefied product gas is vaporized at a temperature of −260° F. by indirect heat exchange with the top gas of the column 27 condensing in a coil 36 in the condenser. The resultant product gas lean in nitrogen passes from the shell space 34 into a line 37 in which it mixes with a gaseous mixture of ethane, 2.2 mol percent and methane, 97.8 mol percent from an incoming branch line 38. The resultant mixture passes into a compressor 39 in which it is compressed to a pressure of 350 p.s.i.a. The compressed gas passes at a temperature of 87° F. into an output line 40 in which it mixes with a gas/liquid mixture consisting of methane, 27.3 mol percent and ethane 72.7 mol percent from an incoming branch line 41. Upon mixing, the liquid in the gas/liquid mixture from the line 41 evaporates. The resultant gaseous mixture passes out of the system as a product gas lean in nitrogen and at a temperature of 57° F.

The top gas in the distillation column 27 passes therefrom via a line 42 into the coil 36 in the condenser 35. In the coil 36, the top gas is cooled and completely condensed by indirect heat exchange with the liquefied product gas in the shell space 34 of the condenser as described above. The liquefied top gas passes into a line 43. Part of the liquefied top gas in the line 43 passes via an outgoing branch line 44 thereof into the upper part of the column 27 as reflux. The rest of the liquefied top gas in the line 43 continues therealong and passes via a reduction valve 45 into a line 46 in which there is a lower pressure of 20 p.s.i.a. During the passage of the liquefied top gas through the valve 45, about 40% of said gas evaporates. The resultant mixture of gas and liquid obtained in the line 46 passes into a separation vessel 47. In the vessel 47, a top product consisting of gaseous nitrogen and a bottom product consisting of liquid nitrogen separate.

The liquid bottom product (namely liquid nitrogen) in the separation vessel 47 passes therefrom via a line 48 and a reduction valve 49 into a further line 50 in which there is a lower pressure of 14.7 p.s.i.a. During the passage of the liquid bottom product through the valve 49, a small amount of gaseous nitrogen is formed. The resultant mixture of gaseous and liquid nitrogen in the line 50 passes into a storage tank 51 for liquid nitrogen. The liquid nitrogen in the tank 51 is available as product under a pressure of 14.7 p.s.i.a. and at a temperature of −320° F. Gaseous nitrogen obtained in the tank 51 is vented to atmosphere through a gas vent 52 in the roof of the tank.

The gaseous top product (namely gaseous nitrogen) in the separation vessel 47 passes therefrom via a line 53 into the shell space 8 of the heat exchanger 7 in which it cools the feed gas in the coil 6 in the heat exchanger as explained above. The gaseous top product passes from the shell space 8 into an output line 54, and thence out of the system as product.

In the cooling provided by the aftercooler 22, use is made of evaporating liquefied natural gas in the following manner. Liquefied natural gas from an available source consisting of 90% methane and 10% ethane and under a pressure of 20 p.s.i.a. and at a temperature of −250° F. enters the system via a line 55 and passes via a reduction valve 56 into a line 57 in which there is a lower pressure of 15 p.s.i.a. The liquefied natural gas then passes into the cold side 23 of the aftercooler 22. In the cold side 23, the liquefied natural gas partly evaporates at a temperature of −230° F., and cools the gas mixtures in the warm side 21 of the aftercooler 22 as described above. In so doing, the liquefied natural gas is partly vaporized to give an equilibrium liquid and gas at a temperature of 230° F. The liquid consists of methane, 27.3 mol percent and ethane, 72.7 mol percent, and the gas consists of methane 97.8 mol percent and ethane, 2.2 mol percent.

The gas obtained in the cold side 23 of the aftercooler 22 passes into the line 38, and thence into the line 37 as described above. The liquid obtained in the cold side 23 passes therefrom via a line 58 into a pump 59 that increases the pressure on it to 350 p.s.i.a. The liquid then passes from the pump 59 via a line 60 into the shell space 13 of the heat exchanger 12. In the shell space 13, the liquid cools the feed gas in the coil 11 in the heat exchanger 13 as described above and is partly vaporized. The resultant mixture of gas and liquid in the shell space 12 passes therefrom into the line 41, and thence into the line 40 as described above.

It will be apparent that the embodiments shown are only exemplary and that various modifications can be made in construction and arrangement within the scope of my invention as defined in the appended claims.

I claim:

1. A method of separating nitrogen from a nitrogen rich feed gas to give a product gas lean in nitrogen, comprising:
   (a) liquefying the nitrogen rich feed gas;
   (b) fractionally distilling the liquefied feed gas from step (a) in a distillation column to give
      (1) a top gas comprising gaseous nitrogen and
      (2) to leave a bottom liquid,
      (3) heat removed from the feed gas in step (a) being used to vaporize part of said bottom liquid to give a gas that provides bottom heat for the fractionation and to leave
      (4) a liquefied product gas lean in nitrogen;
   (c) cooling the liquefied product gas from step (b);
   (d) reducing the pressure on the cooled liquefied product gas from step (c);
   (e) vaporizing the liquefied product gas from step (d) by indirect heat exchange with the top gas from step (b) to give
      (1) product gas lean in nitrogen and
      (2) to condense said top gas;
   (f) recycling part of the liquefied top gas from step (e) to the fractional distillation in step (b);
   (g) reducing the pressure on the liquefied feed gas from step (a) before effecting step (b), and
   (h) cooling the liquefied feed gas from step (a) by means used to effect the cooling in step (c) before effecting step (g).

2. A method of separating nitrogen from a nitrogen rich feed gas to give a product gas lean in nitrogen, comprising:
   (a) liquefying the nitrogen rich feed gas;
   (b) fractionally distilling the liquefied feed gas from step (a) in a distillation column to give
      (1) a top gas comprising gaseous nitrogen and
      (2) to leave a bottom liquid,
      (3) heat removed from the feed gas in step (a) being used to vaporize part of said bottom liquid to give a gas that provides bottom heat for the fractionation and to leave (4) a liquefied product gas lean in nitrogen;
(c) cooling the liquefied product gas from step (b);
(d) reducing the pressure on the cooled liquefied product gas from step (c);
(e) vaporizing the liquefied product gas from step (d) by indirect heat exchange with the top gas from step (b) to give
    (1) product gas lean in nitrogen and
    (2) to condense said top gas;
(f) recycling part of the liquefied top gas from step (e) to the fractional distillation in step (b);
(g) effecting the cooling in step (c) by part evaporation of a source of liquefied gas of the same nature as the less volatile component of the feed gas.

3. A method as claimed in claim 2, comprising mixing the vapor produced from the evaporating liquefied gas with the product gas from step (e).

4. A method as claimed in claim 2, comprising increasing the pressure on the residual liquid from the evaporating liquefied gas; using the pressurized residual liquefied gas to cool part of the feed gas before effecting step (a), thereby partly vaporizing said liquefied gas; and mixing the resultant mixture of gas and liquid thereby produced from said liquefied gas with compressed gas obtained by compressing a mixture of product gas from step (e) and the vaporized liquefied gas used to cool by heat exchange the liquefied product cooled in step (c).

5. A method of separating nitrogen from a nitrogen rich feed gas to give a product gas lean in nitrogen, comprising:
(a) liquefying the nitrogen rich feed gas;
(b) fractionally distilling the liquefied feed gas from step (a) to give
    (1) a top gas comprising gaseous nitrogen and
    (2) to leave a bottom liquid,
    (3) heat removed from the feed gas in step (a) being used to vaporize part of said bottom liquid to give a gas that provides bottom heat for the fractionation and to leave
    (4) a liquefied product gas lean in nitrogen;
(c) cooling the liquefied product gas from step (b);
(d) reducing the pressure on the cooled liquefied product gas from step (c);
(e) vaporizing the liquefied product gas from step (d) by indirect heat exchange with the top gas from step (b) to give
    (1) product gas lean in nitrogen and
    (2) to condense said top gas;
(f) recycling part of the liquefied top gas from step (e) to the fractional distillation in step (b);
(g) reducing the pressure on that portion of the liquefied top gas from step (e) not recycled in step (f) to give a cooler gas comprising gaseous nitrogen and to leave a cooler liquid comprising liquefied nitrogen and
(h) using said cooler gas to cool the feed gas before it is liquefied in step (a).

6. A method of separating nitrogen from a nitrogen rich feed gas to give a product gas lean in nitrogen, comprising:
(a) liquefying the nitrogen rich feed gas;
(b) fractionally distilling the liquefied feed gas from step (a) to give
    (1) a top gas comprising gaseous nitrogen and
    (2) to leave a bottom liquid,
    (3) heat removed from the feed gas in step (a) being used to vaporize part of said bottom liquid to give a gas that provides bottom heat for the fractionation and to leave
    (4) a liquefied product gas lean in nitrogen;
(c) cooling the liquefied product gas from step (b);
(d) reducing the pressure on the cooled liquefied product gas from step (c);
(e) vaporizing the liquefied product gas from step (d) by indirect heat exchange with the top gas from step (b) to give
    (1) product gas lean in nitrogen and
    (2) to condense said top gas;
(f) recycling part of the liquefied top gas from step (e) to the fractional distillation in step (b);
(g) effecting the cooling in step (c) by partly evaporating liquefied natural gas.

References Cited

UNITED STATES PATENTS

| | | | |
|---|---|---|---|
| 1,664,412 | 4/1928 | Haynes | 62—31 X |
| 2,587,820 | 3/1952 | Cartier | 62—31 X |
| 2,600,110 | 6/1952 | Hachmuth | 62—31 X |
| 2,619,814 | 12/1952 | Kneil | 62—31 X |

NORMAN YUDKOFF, *Primary Examiner.*

W. PRETKA, *Assistant Examiner.*